(12) United States Patent
Romani

(10) Patent No.: US 7,469,229 B2
(45) Date of Patent: Dec. 23, 2008

(54) GENERATION OF ESTIMATED PRICES OF INSTRUMENTS FOR A TRADE IN A COMBINATION OF INSTRUMENTS

(75) Inventor: Alessandro Romani, Stockholm (SE)

(73) Assignee: OMX Technology AB, Stockholm (SE)

( * ) Notice: Subject to any disclaimer, the term of this patent is extended or adjusted under 35 U.S.C. 154(b) by 1072 days.

(21) Appl. No.: 10/348,328

(22) Filed: Jan. 22, 2003

(65) Prior Publication Data

US 2004/0143537 A1     Jul. 22, 2004

(51) Int. Cl.
*G06Q 40/00* (2006.01)
(52) U.S. Cl. ...................................... 705/37
(58) Field of Classification Search ................. 705/37
See application file for complete search history.

(56) References Cited

U.S. PATENT DOCUMENTS

| | | | |
|---|---|---|---|
| 6,272,473 B1* | 8/2001 | Sandholm | 705/37 |
| 6,401,080 B1* | 6/2002 | Bigus et al. | 705/37 |
| 7,162,447 B1* | 1/2007 | Cushing | 705/37 |
| 2002/0026404 A1* | 2/2002 | Thompson | 705/37 |
| 2002/0082977 A1* | 6/2002 | Hammond et al. | 705/37 |
| 2003/0200167 A1* | 10/2003 | Kemp et al. | 705/37 |
| 2005/0160024 A1* | 7/2005 | Soderborg et al. | 705/37 |

OTHER PUBLICATIONS

Matthew Bender & Company, Inc., LexisNexis Group. Effective Legal Negotiation and Settlement. Chapter 7: the Competitive/Distributive Stage. Copywright 2001.*
Tully, Judd. The Slyest Bidder, Forbes. New York: Fall 1999. p. 44, 4 pgs.*
Related U.S. Appl. No. 10/454,833, filed Jun. 5, 2003; Inventor: Alessandro Romani.

* cited by examiner

*Primary Examiner*—James Kramer
*Assistant Examiner*—David L Wood
(74) *Attorney, Agent, or Firm*—Nixon & Vanderhye P.C.

(57) ABSTRACT

In an automatic trade system wherein bids and offers in instruments as well as in combinations of instruments are received and a trade in an instrument or in a combination of instruments is performed when, for a certain number of that instrument or combination of instruments, a bid price matches an ask price, a method for generating estimated prices of instruments for a trade in a combination of instruments, comprises the steps of (i) identifying for each bid/offer in each one of said instruments its bid/ask price; (ii) storing the identified bid/ask price of the last bid/offer in each one of said instruments; and (iii) generating said estimated prices based on the stored bid/ask price of the last bid/offer in at least one of said instruments, which is comprised in said combination of instruments, independent on whether said last bid/offer still exists or not at the time of generating said estimated prices.

36 Claims, 4 Drawing Sheets

| Bid | Ask | Store |
|---|---|---|
| - | - | Default value |

Fig. 2

| Bid | Ask | Store |
|---|---|---|
| 10 (first bid entered) | - | 10 |

Fig. 3

| Bid | Ask | Store |
|---|---|---|
| 10 | 13 (first ask entered) | 13 |

Fig. 4

| Bid | Ask | Store |
|---|---|---|
| 10 - | 12 13 | 12 |

Fig. 5

| Bid | Ask | Store |
|---|---|---|
| 11<br>10 | 12<br><br>13 | 11 |

Fig. 6

| Bid | Ask | Store |
|---|---|---|
| 10<br>(best price removed) | 12<br><br>13 | 11 |

Fig. 7

| Bid | Ask | Store |
|---|---|---|
| -<br>(order removed) | 12<br><br>13 | 11 |

Fig. 8

| Bid | Ask | Store |
|---|---|---|
| - | 11,5<br><br>12<br><br>13 | 11,5 |

Fig. 9

| Bid | Ask | Store |
|---|---|---|
| - | 11 | 11,5 |
| | (bait order) | |
| | 11,5 | |
| | 12 | |
| | 13 | |
Fig. 10
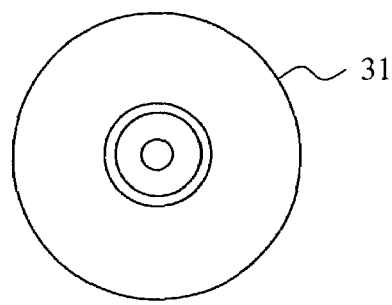
Fig. 11
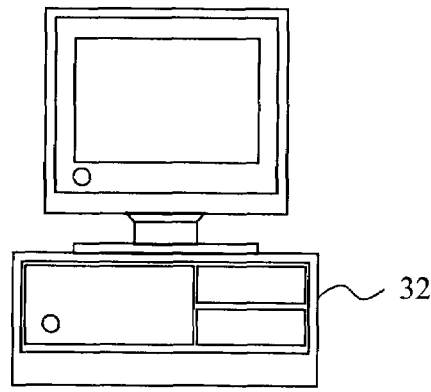
Fig. 12

GENERATION OF ESTIMATED PRICES OF INSTRUMENTS FOR A TRADE IN A COMBINATION OF INSTRUMENTS

TECHNICAL FIELD OF THE INVENTION

The present invention relates generally to combination trading and more specifically to methods for generating estimated prices of instruments for a trade in a combination of instruments, to computer program products for performing the methods, and to automatic trading systems having the methods implemented.

BACKGROUND

In so-called combination trading, or simply combo trading, a trader places on the market a single price for a combination of different instruments. These different instruments can be shares, options etc. or any combinations thereof. A combination order could for example be "Sell two lots of instrument A, and buy three lots of instrument B for a combination price of $100".

A combination order is typically listed as a single item on the market. Thus, in order for a combination order to get be executed, all the involved instruments must be traded as a single order. This combination instrument could be a tailor made combination (TMC) or a standard combination. The strategy is the specific relation between the different instruments making up the combination. The number of different instruments, or so-called legs, could vary from two, as in the example above, up to four or even more.

When a combination order has been executed, the prices for the different kinds of instruments traded, the so-called leg prices, are typically determined. In the above given example, one leg price for the instrument A and another leg price for the instrument B are determined. One reason for this need to determine leg prices is because the different instruments could for example have been traded for different clients of the broker. Another reason could be that that the leg prices should be booked on different accounts.

If a combination order is met by a number of orders in individual instruments making up the combination, the leg prices may of course be determined from the actual paid prices for the different instruments.

However, if a combination order is met by another combination order the determination of leg prices is not straightforward. Typically, when determining the leg prices, the market is looked at, and estimated prices are generated and assigned to the different legs. A so-called seed price may be generated as the estimated price for each leg but the last one of the combination, whereas the price of the last leg may be generated from the paid price of the combination order and the seed prices as generated.

One way of finding the seed prices is to look at the current bid, ask and/or last paid prices on the market for the individual instruments and assign the leg prices accordingly in any desired order. In the situation where the market has just opened and there are no orders and there have been no trades on all the series, the seed prices will typically be theoretical or default values.

SUMMARY

There are drawbacks and limitations of the approaches described above. For instance, in an instrument, which has a very low turnover rate, bids and offers may rarely be received by the system. When no bid or ask prices exist the leg price is typically generated from the last paid price. However, the last trade may have occurred a considerable period of time earlier, i.e. hours earlier, and the market may have changed since. Thus, the leg prices generated may reflect the market poorly.

It is an object to provide a method for generating prices of instruments for a trade in a combination of instruments, i.e., leg prices, which are more up to date and thus better reflect current market trends. Such a method is particularly useful when the combination of instruments involve instruments; which have low turnover rates.

It is a further object to provide traders of combinations of instruments with more accurate leg prices, which in turn allows the traders to perform better trades.

It is yet a further object to provide such a method, which is easy to implement in existing trade systems It is still a further object to provide a software product loadable into the internal memory of a computer for performing such a method for generating estimated prices of instruments for a trade in a combination of instruments when the software product is run on the computer.

It is yet a further object to provide an automatic trade system for receiving bids and offers in instruments as well as in combinations of instruments, and for performing a trade in an instrument or in a combination of instruments when, for a certain number of that instrument or combination of instruments, a bid price matches an ask price, which is adapted to generate estimated prices of instruments for a trade in a combination of instruments.

These objects among others are attained by methods, computer program products and automatic trade systems as claimed.

An advantage of the claimed technology is that leg prices are generated based on the last known prevailing market, independent of whether the individual instruments have actually been traded.

BRIEF DESCRIPTION OF THE DRAWINGS

FIGS. 2-10 are schematic highly simplified extracts of an order book of an inventive trade system for a single instrument illustrating principles of the method as illustrated in FIG. 1.

FIG. 11 illustrates a storage medium, which stores a computer program product.

FIG. 12 illustrates a computer, in which an automatic trade system is implemented.

DETAILED DESCRIPTION

Figure 1:
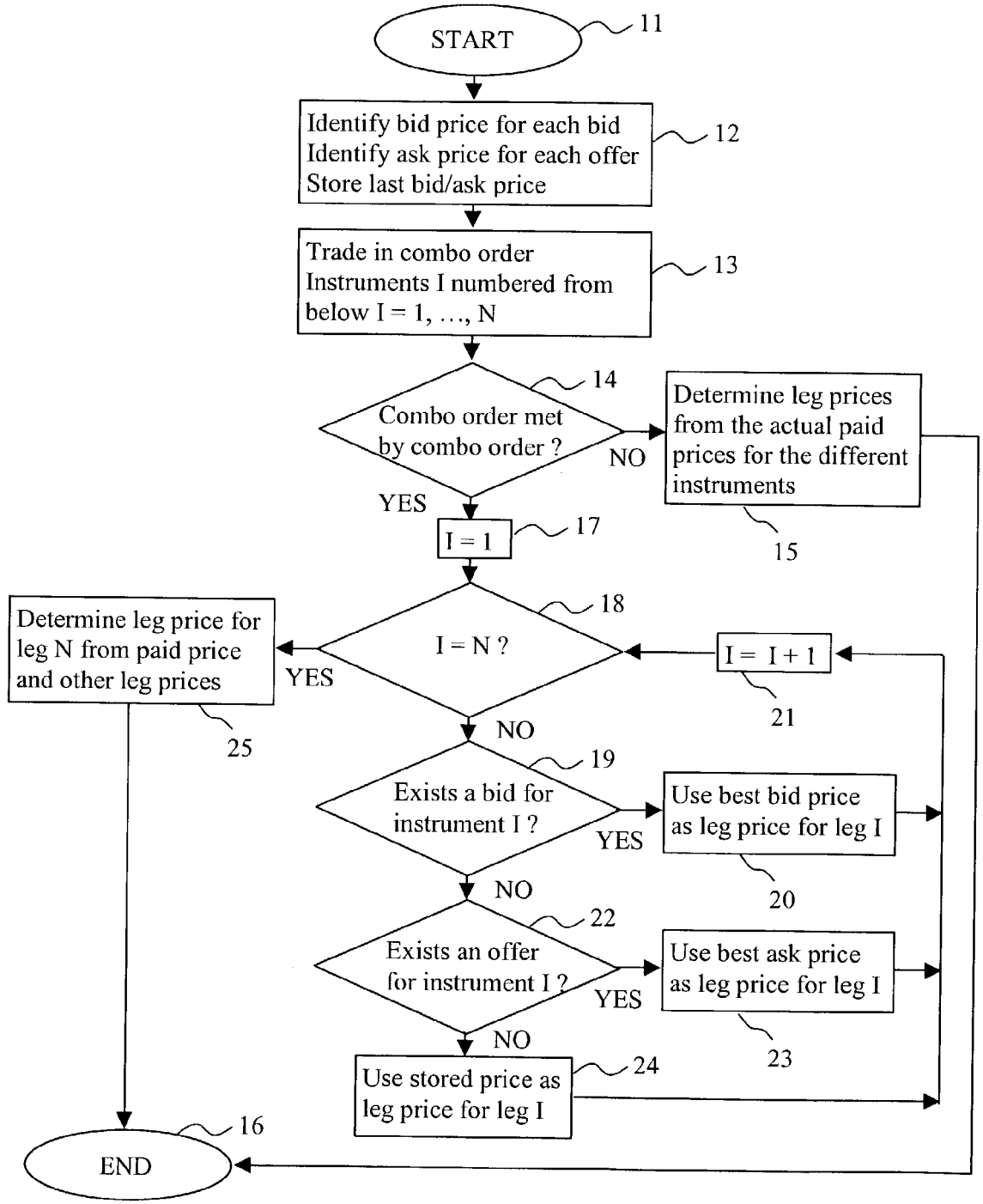
FIG. 1 is a schematic flow scheme of a method according to a preferred example embodiment.

With reference to FIG. 1, which is a schematic flow scheme of an algorithm for generating estimated prices of instruments for a trade in a combination of instruments, a preferred example embodiment will be described. The illustrated algorithm is implemented in an automatic trade system wherein bids and offers in instruments as well as in combinations of instruments are received and entered into an order book, and a trade in an instrument or in a combination of instruments is performed when, for a certain number of that instrument or combination of instruments, a bid price matches an ask price.

In a step 11 the algorithm is started, and in a step 12 the bid price of each bid and the ask price of each offer are identified in each of the individual instruments that are traded by the system. In step 12 the identified bid price of the last bid or the identified ask price of the last offer, whichever is latest, in each of the instruments is stored in a memory of the trade system. This assures the presence of good values for seeding prices if there is a later situation when there are no longer bids and asks in the market because traders have removed their orders or market makers have removed their quotes.

Then, in a step 13, a trade in a combination of instruments I is registered. The instruments making up the combination is numbered from 1 to N from below. N is typically 2-4, but larger combinations may exist. If the combination contains shares, these instruments are usually listed at the very bottom of the combination, and leg prices are first generated for these instruments.

Next, in a step 14, it is checked whether the combination order was met by another combination order or not. If the answer is negative, i.e. the combination order is met by a number of orders in individual instruments making up the combination, the leg prices are, in a step 15, simply determined from the actual paid prices for the different instruments, and the algorithm is, in a step 16, ended.

Naturally, however, the algorithm is running constantly: step 12 is performed repeatedly as soon a new bid or offer is received by the system and steps 13, 14 and so on are performed as soon as a new combination trade is performed.

If the answer is affirmative, i.e. the combination order was met by another combination order, leg prices have to be generated for the different instruments in the combination. A variable I for the instrument to be considered is, in a step 17, set to 1, and in a step 18 it is checked whether I=N, i.e. whether the final instrument in the combination is to be considered. This cannot be the case at this stage since a combination order has to involve at least two different instruments, i.e. N is at least 2. Thus, in a step 19, it is checked whether there exists a bid in instrument No. 1 in the order book.

If the answer is affirmative the best bid price, i.e. the highest bid price available in the order book is, in a step 20, used as the leg price for instrument No. 1, the variable I is, in a step 21, incremented by 1, and the algorithm is returned to step 18 to consider next instrument, i.e. instrument 2.

If the answer is negative, it is, in a step 22, checked whether there exists an offer in instrument 1 in the order book.

If there does exist an offer in instrument 1 in the order book the best ask price, i.e. the lowest ask price available in the order book is, in a step 23, used as the leg price for instrument No. 1, after which the algorithm is returned to step 21 to increment the variable I and then returned to step 18.

If there does not exist an offer in instrument 1 in the order book the stored bid price of the last bid or the ask price of the last offer, whichever is latest, as stored in the memory is, in a step 24, used as the leg price for instrument No. 1, after which the algorithm is returned to step 21 to increment the variable I and then returned to step 18.

Next, in step 18, it is checked whether instrument No. 2 is the final instrument in the combination order, and if this is not the case steps 19-24 are repeated to generate a leg price for the second instrument. This procedure is repeated to generate a leg price for each instrument but the final one in the combination. When the variable I has been incremented to correspond to the final instrument in the combination, a leg price is, in a step 25, generated from the paid price for the combination order and the leg prices for the other instruments in the combination.

The combination may be a standard combination or a tailor made combination (TMC).

In an alternative version of the algorithm an estimated leg price for the final instrument may also be generated from the best bid price, the best ask price, or the price of the last bid or offer, whichever is the latest, in that priority order, and be compared with the estimated leg price as generated in step 25.

If large discrepancies are found corrections of the leg prices of the instruments in the combination order may have to be performed.

In another alternative, the best ask price is given higher priority than the best bid price, and if an offer in a particular instrument exists in the order book, the leg price is generated from the best ask price (even if bids in that instrument exist in the order book).

Further, the algorithm can be modified to take into account situations where no bid or offer has been received during that trading day. For instance when a trading day begins a default value or a theoretical value may be stored for each instrument and subsequently used in the generation of leg prices provided that no bid or offer has yet been received.

Another option is to use last bid, ask or paid prices during a previous trading day.

Sometimes trades are performed without bids and offers being entered into the order book, and if such a trade is performed before any bids and offers in that instrument have been entered into the order book, the last paid price may be used for the generation of a leg price for that instrument.

Thus, the steps described above include storing the identified bid price of the last bid or the identified ask price of the last offer, whichever is latest, in each one of the instruments; and generating the leg prices based on the stored bid price of the last bid or the ask price of the last offer, whichever is latest, in all instruments but one of the instruments making up the combination of instruments, when no bids and offers are active in these instruments. This method generates more up to date leg prices, which better reflect current market trends as compared to prior art methods. Thus, traders of combinations of instruments can be provided with more accurate leg prices, which in turn allows the traders to perform better trades. This is particularly useful when the combination of instruments involve instruments, which have low turnover rates.

With reference now to FIGS. 2-10, which are schematic simplified extracts of an order book for a single instrument, principles of how the identifications and storage of bid and ask example prices according to the method as illustrated in FIG. 1 will be described FIG. 2 illustrates a typical situation at the beginning of a trading day: no bids or offers have been received and in a particular store field is written a default value. As soon as a bid or an offer is received the field will be updated. It is in this field the identified bid price of the last bid or the identified ask price of the last offer, whichever is latest, in each of the instruments is stored in step 12.

In FIG. 3 a first bid has been received at a bid price of 10 and accordingly 10 is written over the default value in the store field. Note that the quantity of each bid and offer has been omitted in FIGS. 2-10 for purposes of illustrating the present invention.

In FIG. 4 a first ask price of 13 has been received, and the store field is updated again. In FIG. 5 an ask price of 12 has been received and the store field is updated once again since 12 is a better offer than 13. Thus, by last ask price in the present text is preferably meant last best or lowest ask price.

In FIG. 6 a bid price of 11 has been received and the store field is updated with this figure since it is a higher bid price that the earlier one. Thus, by last bid price in the present text is preferably meant last best or highest bid price.

In FIG. 7 the best bid price has been removed from the order book. However, this does not lead to any changes of the store field.

In FIG. 8 all bids have been removed, and in FIG. 9 an ask price of 11.5 has been received, and this last ask price updates the store field.

Finally, in FIG. 10 an ask price of 11 has been received. This is, however, not an actual offer in this single instrument, but a bait order also termed "derived order" originating from a combination order. For instance, using the example given on page 1, "Sell two lots of instrument A, and buy three lots of instrument B for a combination price of $100", and if there exists an offer of three lots in instrument B at an ask price of $150 and no bids are present in the instrument A, a bait bid in instrument A at a bid price of 50 may be generated automatically by the trading system. Bait orders are preferably not counted as orders that may update the store field and may accordingly not be used in the generation of leg prices.

It shall be appreciated that several alternative generalized versions of the above may be realized. For instance, a method for generating leg prices of instruments for a trade in a combination of instruments, may comprise the steps of (i) identifying for each bid in each one of the instruments traded its bid price; (ii) storing the identified bid price of the last bid in each one of the instruments; and (iii) generating the leg prices based on the stored bid price of the last bid in at least one of the instruments in the combination of instruments, independent on whether the last bid still exists or not at the time of generating the estimated prices.

Alternatively, instead of identifying, storing and basing the generation of the leg prices on the last bid price, the last ask price may be identified, stored, and used for the generation of the leg prices.

As another alternative, instead of identifying, storing and basing the generation of the leg prices on the last bid price, the last paid price may be identified, stored, and used for the generation of the leg prices, preferably provided that the last paid price is later than the last bid price and later than the last ask price.

The at least one of the instruments in the combination of instruments, is preferably the last instrument in the combination. Leg prices for the other one(s) of the instruments but the last instrument in the combination may be generated in a corresponding manner. The last bid or offer may have been withdrawn or may have led to a trade before the time of generating the estimated prices.

A another example alternate, both the last bid price and the last ask price are stored and used in the generation of the leg prices. Accordingly, the spread is known. The leg price of the at least one of the instruments in the combination of instruments, may then be generated as the mean value of the last.

Finally, FIG. 11 illustrates a storage medium 31, which stores a computer program for performing any of the methods described, and FIG. 12 illustrates a computer 32, in which an automatic trade system is implemented.

Such automatic trading system comprises modules for receiving bids and offers in instruments as well as in combinations of instruments; and for performing a trade in an instrument or in a combination of instruments when, for a certain number of that instrument or combination of instruments, a bid price matches an ask price. Further the system comprises a computer program product for performing any of the described methods.

What is claimed is:

1. A method for operating an automatic trade system comprising:
   establishing in a memory space multiple order books for trading different instruments;
   receiving bids and offers in different instruments;
   entering any received bids and offers for the same instrument into the order book established in memory for that instrument;
   establishing in a memory space multiple order books for trading different combination orders, each combination order including multiple different leg orders, where each leg order corresponds to an order for an individual instrument;
   performing a trade in an instrument when, for a certain number of that instrument, a bid price for that instrument entered in that instrument's order book matches an ask price for that instrument entered in that instrument's order book;
   storing a latest bid price and a latest ask price for individual instruments in a latest price memory space separate from the memory space storing the order books;
   receiving bids and offers for combination orders;
   entering any received bid and offer for the same combination order into an order book established in memory for that combination order;
   performing a trade in a combination order for different instruments when a bid price for that combination order entered in the order book corresponding to that combination order matches an ask price for that combination order entered in the corresponding combination order book;
   when there is a combination order match in the corresponding combination order book, generating estimated prices of instruments in the matched combination order in accordance with the following steps:
   determining there is no order book bid price for an instrument corresponding to one of the legs in the matched combination order; and
   generating an estimated price for the leg instrument for which there is no order book bid price based on one of the prices stored in the latest price memory space.

2. The method in claim 1, wherein the estimated price for the leg instrument for which there is no order book bid price is generated based on the stored latest bid price for the leg instrument in the latest price memory space.

3. The method in claim 1, further comprising:
   determining that a leg instrument for the combination order is a last leg instrument for which a price must be estimated for the combination order, and
   calculating an estimated price for the last leg instrument based on a match price of the matched combination order.

4. The method of claim 1, further comprising:
   generating an estimated bid price for one of the leg instruments in the matched combination order for which there is an order book bid price using that order book bid price, and
   generating an estimated ask price for one of the leg instruments in the matched combination order for which there is an order book ask price using that order book ask price.

5. The method of claim 1, wherein the estimated price for the leg instrument for which there is no order book bid price is generated based on the stored latest ask price for the leg instrument in the latest price memory space.

6. The method of claim 1, wherein the estimated price for the leg instrument for which there is no order book bid price is generated based on a mean value of the stored latest bid price and latest ask price for the leg instrument in the latest price memory space.

7. The method of claim 1, wherein one or both of the stored latest bid price and latest ask price for the leg instrument in the latest price memory space is/are theoretically calculated or generated based on a bid, ask or paid price for the leg instrument during a previous trading day.

8. The method of claim 1, wherein:
received bids and offers in combination orders are divided into bait bids and offers in instruments included in the combination orders, and
bid prices of bait bids are not stored in the latest price memory space.

9. The method of claim 1, wherein in estimating the price for the leg instrument, an ask price for the leg instrument has a higher priority than a bid price for the leg instrument.

10. The method in claim 1, wherein the estimated price for the leg instrument for which there is no order book bid price is generated based on a latest stored one of an ask price and bid price for the leg instrument stored in the latest price memory space.

11. A computer program product loadable into a memory of a computer in an automatic trade system, comprising software code portions for performing the following method when the product is run on the computer:
establishing in a memory space multiple order books for trading different instruments;
receiving bids and offers in different instruments;
entering any received bids and offers for the same instrument into the order book established in memory for that instrument;
establishing in a memory space multiple order books for trading different combination orders, each combination order including multiple different leg orders, where each leg order corresponds to an order for an individual instrument;
performing a trade in an instrument when, for a certain number of that instrument, a bid price for that instrument entered in that instrument's order book matches an ask price for that instrument entered in that instrument's order book;
storing a latest bid price and a latest ask price for individual instruments in a latest price memory space separate from the memory space storing the order books;
receiving bids and offers for combination orders;
entering any received bid and offer for the same combination order into an order book established in memory for that combination order;
performing a trade in a combination order for different instruments when a bid price for that combination order entered in the order book corresponding to that combination order matches an ask price for that combination order entered in the corresponding combination order book;
when there is a combination order match in the corresponding combination order book, generating estimated prices of instruments in the matched combination order in accordance with the following steps:
determining there is no order book bid price for an instrument corresponding to one of the legs in the matched combination order: and
generating an estimated price for the leg instrument for which there is no order book bid price based on one of the prices stored in the latest price memory space.

12. An automatic trade system comprising a computer and a memory where the computer is configured to:
establish in a memory space of the memory multiple order books for trading different instruments;
receive bids and offers in different instruments;
enter any received bids and offers for the same instrument into the order book established in memory for that instrument;
establish in a memory space of the memory multiple order books for trading different combination orders, each combination order including multiple different leg orders, where each leg order corresponds to an order for an individual instrument;
perform a trade in an instrument when, for a certain number of that instrument, a bid price for that instrument entered in that instrument's order book matches an ask price for that instrument entered in that instrument's order book;
store a latest bid price and a latest ask price for individual instruments in a latest price memory space in the memory separate from the memory space storing the order books;
receive bids and offers for combination orders;
enter any received bid and offer for the same combination order into an order book established in memory for that combination order;
perform a trade in a combination order for different instruments when a bid price for that combination order entered in the order book corresponding to that combination order matches an ask price for that combination order entered in the corresponding combination order book;
when there is a combination order match in the corresponding combination order book, generate estimated prices of instruments in the matched combination order by determining there is no order book bid price for an instrument corresponding to one of the legs in the matched combination order and generating an estimated price for the leg instrument for which there is no order book bid price based on one of the prices stored in the latest price memory space.

13. The automatic trade system in claim 12, wherein the computer is configured to generate the estimated price for the leg instrument for which there is no order book bid price based on the stored latest bid price for the leg instrument in the latest price memory space.

14. The automatic trade system in claim 12, wherein the computer is configured to:
determine that a leg instrument for the combination order is a last leg instrument for which a price must be estimated for the combination order, and
calculate an estimated price for the last leg instrument based on a match price of the matched combination order.

15. The automatic trade system in claim 12, wherein the computer is configured to generate the estimated price for the leg instrument for which there is no order book bid price based on the stored latest ask price for the leg instrument in the latest price memory space.

16. A method for operating an automatic trade system comprising:
establishing in a memory space multiple order books for trading different instruments;
receiving bids and offers in different instruments;
entering any received bids and offers for the same instrument into the order book established in memory for that instrument;
establishing in a memory space multiple order books for trading different combination orders, each combination order including multiple different leg orders, where each leg order corresponds to an order for an individual instrument;
performing a trade in an instrument when, for a certain number of that instrument, a bid price for that instrument entered in that instrument's order book matches an ask price for that instrument entered in that instrument's order book;

storing a latest bid price and a latest ask price for individual instruments in a latest price memory space separate from the memory space storing the order books;

receiving bids and offers for combination orders;

entering any received bid and offer for the same combination order into an order book established in memory for that combination order;

performing a trade in a combination order for different instruments when a bid price for that combination order entered in the order book corresponding to that combination order matches an ask price for that combination order entered in the corresponding combination order book;

when there is a combination order match in the corresponding combination order book, generating estimated prices of instruments in the matched combination order in accordance with the following steps:

determining there is no order book ask price for an instrument corresponding to one of the legs in the matched combination order; and generating an estimated price for the leg instrument for which there is no order book ask price based on one of the prices stored in the latest price memory space.

17. The method in claim 16, wherein the estimated price for the leg instrument for which there is no order book ask price is generated based on the stored latest ask price for the leg instrument in the latest price memory space.

18. The method in claim 16, further comprising:

determining that a leg instrument for the combination order is a last leg instrument for which a price must be estimated for the combination order, and calculating an estimated price for the last leg instrument based on a match price of the matched combination order.

19. The method of claim 16, further comprising:

generating an estimated ask price for one of the leg instruments in the matched combination order for which there is an order book ask price using that order book ask price, and generating an estimated bid price for one of the leg instruments in the matched combination order for which there is an order book bid price using that order book bid price.

20. The method of claim 16, wherein the estimated price for the leg instrument for which there is no order book ask price is generated based on the stored latest bid price for the leg instrument in the latest price memory space.

21. The method of claim 16, wherein the estimated price for the leg instrument for which there is no order book ask price is generated based on a mean value of the stored latest bid price and latest ask price for the leg instrument in the latest price memory space.

22. The method of claim 16, wherein one or both of the stored latest bid price and latest ask price for the leg instrument in the latest price memory space is/are a theoretically calculated or is/are generated based on a bid, ask or paid price for the leg instrument during a previous trading day.

23. The method of claim 16, wherein in estimating the price for the leg instrument, an ask price for the leg instrument has a higher priority than a bid price for the leg instrument.

24. The method in claim 16, wherein the estimated price for the leg instrument for which there is no order book ask price is generated based on a latest stored one of an ask price and bid price for the leg instrument stored in the latest price memory space.

25. A computer program product loadable into a memory of a computer in an automatic trade system, comprising software code portions for performing the following method when the product is run on the computer:

establishing in a memory space multiple order books for trading different instruments:

receiving bids and offers in different instruments:

entering any received bids and offers for the same instrument into the order book established in memory for that instrument;

establishing in a memory space multiple order books for trading different combination orders, each combination order including multiple different leg orders, where each leg order corresponds to an order for an individual instrument;

performing a trade in an instrument when, for a certain number of that instrument, a bid price for that instrument entered in that instrument's order book matches an ask price for that instrument entered in that instrument's order book;

storing a latest bid price and a latest ask price for individual instruments in a latest price memory space separate from the memory space storing the order books;

receiving bids and offers for combination orders;

entering any received bid and offer for the same combination order into an order book established in memory for that combination order:

performing a trade in a combination order for different instruments when a bid price for that combination order entered in the order book corresponding to that combination order matches an ask price for that combination order entered in the corresponding combination order book:

when there is a combination order match in the corresponding combination order book, generating estimated prices of instruments in the matched combination order in accordance with the following steps:

determining there is no order book ask price for an instrument corresponding to one of the legs in the matched combination order; and generating an estimated price for the leg instrument for which there is no order book ask price based on one of the prices stored in the latest price memory space.

26. An automatic trade system comprising a computer and a memory where the computer is configured to:

establish in a memory space of the memory multiple order books for trading different instruments;

receive bids and offers in different instruments;

enter any received bids and offers for the same instrument into the order book established in memory for that instrument;

establish in a memory space of the memory multiple order books for trading different combination orders, each combination order including multiple different leg orders, where each leg order corresponds to an order for an individual instrument;

perform a trade in an instrument when, for a certain number of that instrument, a bid price for that instrument entered in that instrument's order book matches an ask price for that instrument entered in that instrument's order book;

store a latest bid price and a latest ask price for individual instruments in a latest price memory space in the memory separate from the memory space storing the order books;

receive bids and offers for combination orders;

enter any received bid and offer for the same combination order into an order book established in memory for that combination order;

perform a trade in a combination order for different instruments when a bid price for that combination order entered in the order book corresponding to that combination order matches an ask price for that combination order entered in the corresponding combination order book; and when there is a combination order match in the corresponding combination order book, generate estimated prices of instruments in the matched combination order by determining there is no order book ask price for an instrument corresponding to one of the legs in the matched combination order and generating an estimated price for the leg instrument for which there is no order book ask price based on one of the prices stored in the latest price memory space.

27. The automatic trade system in claim 26, wherein the computer is configured to generate the estimated price for the leg instrument for which there is no order book ask price based on the stored latest ask price for the leg instrument in the latest price memory space.

28. The automatic trade system in claim 26, wherein the computer is configured to:
determine that a leg instrument for the combination order is a last leg instrument for which a price must be estimated for the combination order, and
calculate an estimated price for the last leg instrument based on a match price of the matched combination order.

29. The automatic trade system in claim 26, wherein the computer is configured to generate the estimated price for the leg instrument for which there is no order book ask price based on the stored latest bid price for the leg instrument in the latest price memory space.

30. A method for operating an automatic trade system comprising:
establishing in a memory space multiple order books for trading different instruments;
receiving bids and offers in different instruments;
entering any received bids and offers for the same instrument into the order book established in memory for that instrument;
establishing in a memory space multiple order books for trading different combination orders, each combination order including multiple different leg orders, where each leg order corresponds to an order for an individual instrument;
performing a trade in an instrument when, for a certain number of that instrument, a bid price for that instrument entered in that instrument's order book matches an ask price for that instrument entered in that instrument's order book; storing a latest bid price and a latest ask price for individual instruments in a latest price memory space separate from the memory space storing the order books;
receiving bids and offers for combination orders;
entering any received bid and offer for the same combination order into an order book established in memory for that combination order;
performing a trade in a combination order for different instruments when a bid price for that combination order entered in the order book corresponding to that combination order matches an ask price for that combination order entered in the corresponding combination order book;
when there is a combination order match in the corresponding combination order book, generating estimated prices of instruments in the matched combination order in accordance with the following steps:
determining there is no order book price for an instrument corresponding to one of the legs in the matched combination order; and
generating an estimated price for the leg instrument for which there is no order book price based on a latest one of the stored latest bid price or the stored ask price for the leg instrument in the latest price memory space.

31. The method in claim 30, further comprising:
determining that a leg instrument for the combination order is a last leg instrument for which a price must be estimated for the combination order, and
calculating an estimated price for the last leg instrument based on a match price of the matched combination order.

32. A computer program product loadable into the memory of a computer in an automatic trade system, comprising software code portions for performing the method of claim 30 when the product is run on the computer.

33. An automatic trade system comprising a computer and a memory where the computer is configured to:
establish in a memory space of the memory multiple order books for trading different instruments;
receive bids and offers in different instruments;
enter any received bids and offers for the same instrument into the order book established in memory for that instrument;
establish in a memory space of the memory multiple order books for trading different combination orders, each combination order including multiple different leg orders, where each leg order corresponds to an order for an individual instrument; perform a trade in an instrument when, for a certain number of that instrument, a bid price for that instrument entered in that instrument's order book matches an ask price for that instrument entered in that instrument's order book;
store a latest bid price and a latest ask price for individual instruments in a latest price memory space in the memory separate from the memory space storing the order books;
receive bids and offers for combination orders;
enter any received bid and offer for the same combination order into an order book established in memory for that combination order;
perform a trade in a combination order for different instruments when a bid price for that combination order entered in the order book corresponding to that combination order matches an ask price for that combination order entered in the corresponding combination order book; and
when there is a combination order match in the corresponding combination order book, generate estimated prices of instruments in the matched combination order by determining there is no order book price for an instrument corresponding to one of the legs in the matched combination order and generating an estimated price for the leg instrument for which there is no order book price based on a latest one of the stored bid price or the stored ask price for the leg instrument in the latest price memory space.

34. The automatic trade system in claim 33, wherein the computer is configured to:
determine that a leg instrument for the combination order is a last leg instrument for which a price must be estimated for the combination order, and
calculate an estimated price for the last leg instrument based on a match price of the matched combination order.

35. An automatic trade system comprising a computer and a memory where the computer is configured to:
- establish in a memory space of the memory multiple order books for trading different instruments;
- receive bids and offers in different instruments;
- enter any received bids and offers for the same instrument into the order book established in memory for that instrument;
- establish in a memory space of the memory multiple order books for trading different combination orders, each combination order including multiple different leg orders, where each leg order corresponds to an order for an individual instrument;
- perform a trade in an instrument when, for a certain number of that instrument, a bid price for that instrument entered in that instrument's order book matches an ask price for that instrument entered in that instrument's order book;
- store a latest bid price and a latest ask price for individual instruments in a latest price memory space in the memory separate from the memory space storing the order books;
- receive bids and offers for combination orders;
- enter any received bid and offer for the same combination order into an order book established in memory for that combination order;
- perform a trade in a combination order for different instruments when a bid price for that combination order entered in the order book corresponding to that combination order matches an ask price for that combination order entered in the corresponding combination order book; and
- when there is a combination order match in the corresponding combination order book, generate estimated prices of instruments in the matched combination based on a seed price, wherein:
- if there exists a bid price, but no ask price, in the order book for one of the instrument legs in the matched combination order, the seed price is the highest bid price in the one instrument order book;
- if there exists an ask price, but no bid price, in the one instrument order book, the seed price is the lowest ask price in the one instrument order book;
- if there exists a bid price and an ask price in the one instrument order book, the seed price is the highest bid price or the lowest ask price in the one instrument order book; and
- if there exists no bid price or offer price in the one instrument order book, the seed price is the latest one of the latest bid price or the latest ask price for the one instrument stored in the latest price memory space.

36. The automatic trade system in claim 35, wherein the computer is configured to:
- determine that a leg instrument for the combination order is a last leg instrument for which a price must be estimated for the combination order, and
- calculate an estimated price for the last leg instrument based on a match price of the matched combination order

* * * * *